United States Patent Office 3,525,636
Patented Aug. 25, 1970

3,525,636
METHOD AND COMPOSITION FOR PROTECTING A GLASS SURFACE
Burton S. Bogart, Lancaster, Ohio, assignor to Anchor Hocking Corporation, Lancaster, Ohio, a corporation of Delaware
No Drawing. Continuation-in-part of application Ser. No. 458,762, May 25, 1965. This application Oct. 23, 1965, Ser. No. 504,121
The portion of the term of the patent subsequent to May 20, 1986, has been disclaimed
Int. Cl. B41m 1/18; C03c 5/00, 17/00
U.S. Cl. 117—72                                          5 Claims

ABSTRACT OF THE DISCLOSURE

A novel coating composition for application to either pristine glass or coated glass to improve the lubrication of the glass surface and the receptivity of the glass article to adhesives used in labelling. The invention is an aqueous dispersion of carnauba wax and polyvinyl alcohol in a medium comprising an anion-active dispersing agent.

---

This invention relates to a novel coating composition for application to glass surfaces as a lubricant and in order to improve receptivity to adhesives used for labelling. More particularly, the invention concerns an aqueous dispersion of carnauba wax and polyvinyl alcohol to be applied to glass surfaces, the method of preparing and using the same, and glass surfaces coated therewith.

This application is a continuation-in-part of my copending application Ser. No. 458,762 filed May 25, 1965, now issued as U.S. Pat. 3,445,275.

The adverse effects of glass-to-glass contacts upon the strength of glass articles such as containers and flat glass are well recognized, and considerable attention has been devoted to the development of protective coatings which will provide lubrication and at the same time minimize contact damage. There have been proposed for this purpose various polymeric substances, some of which have been adapted to be applied directly, and others, such as silicones and polyethylene, in the form of aqueous emulsions. The latter types of coatings have not been satisfactory in regard to receptivity toward the commonly used label adhesives. It is also known to improve scratch resistance of glass surfaces by exposure to the vapors or sprays or mists of metallo-organic compound or metallic salts of aluminum, titanium, zirconium, germanium, tin, or vanadium at elevated temperatures whereby the vapors are pyrolyzed to form a metal oxide coating on the glass surface as disclosed, for example, in U.S. Pats. Nos. 2,375,482, 2,478,817, or 2,831,780.

In accordance with the present invention, there is provided a novel dispersion type coating composition for application to the surfaces of glass articles which exhibits improved performance characteristics in regard to lubricity and also in regard to the acceptance of labelling adhesives.

The coating dispersion of the invention includes as its active ingredients carnauba wax and polyvinyl alcohol, dispersed with the aid of a suitable dispersing agent.

Carnauba wax or Brazil wax is a hard water insoluble amorphous wax obtained from the leaves of the wax palm Copernica cerifera, melting at about 84°–86° C., and having a sp. gr. of 0.995.

The polyvinyl alcohol employed is a substantially cold water insoluble (88% hydrolyzed) type which can be colloidally dispersed, having a sp. gr. of about 1.21 to 1.31 such types being sold commercially under the designations Elvanol (E. I. du Pont de Nemours and Co.) and Gelvatol Monsanto Co.). A preferred type is Elvanol 51–05.

The dispersing agent employed in accordance with the invention is anion-active. Examples include salts of oleic acid, and of sulfonated dicarboxylic acid esters. Suitable salts of oleic acid include alkali metal oleate, e.g. potassium or sodium oleate. Alkanolamine salts may also be employed, preferably triethanolamine oleate. Alkali metal salts of sulfonated dicarboxylic acid esters may be employed, preferably sodium dioctylsulfosuccinate, sold commercially under the designation Aerosol OT (American Cyanamid Company, New York). Another dispersing agent of the character described which may be employed is a neutral alkali metal soap of whole corn oil particularly the potassium soap made by saponifying the corn oil fatty acid glycerides with a potassium hydroxide solution added in the chemical combining ratio.

The coating composition of the invention, when applied to glass surfaces, and particularly to glass container surfaces, provides a permanent type of coating, which is clear and water-white and which is receptive to most types of label adhesives. It also reduces the tendency of container abrasion by glass-to-glass contact during processing. The composition is readily applied by spraying or brushing to glassware emerging from the low temperature end of an annealing lehr. The reduction in abrasion results in retention of high proportion of the original container strength.

The protective characteristics of this coating including its reduction of abrasion by glass-to-glass contact are particularly important as they allow all handling operations to be carried out at significantly increased speeds. This, in effect, increases the operating speeds at which the various units of the processing equipment may be run including filling, sealing, and inspection machines.

An additional advantage of the coating compositions of the invention lies in their ability to be applied upon an undercoat or substrate of a previously deposited scratch resistant layer of the several metal oxides providing an improved dual protective coating described previously. The carnauba wax-polyvinyl alcohol coating provides extra necessary lubricity, while at the same time the water resistance of the combination is enhanced. A further advantage is that the coating shows good wet as well as dry lubricity, which is a feature unique for most coatings for this purpose, inasmuch as coatings showing good wet lubricity usually also show poor label adhesion characteristics. The coating of the present invention combines all these advantageous features. It also has a film characteristic which is one of exceptional clarity, enhancing the brilliant appearance of the container.

The proportions of the various ingredients of the coating compositions of the invention should preferably be confined within the ranges indicated in order to obtain the desired performance and for maximum stability of the preparations.

The coating composition comprises a combination of two separately prepared portions, one of which is designated carnauba wax base and the other polyvinyl alcohol base. The first is a mixture of carnauba wax, dispersing agent, and water, having the following approximate ranges of composition:

CARNAUBA WAX BASE A

|   | Lbs. |
|---|---|
| Carnauba wax | 15–20 |
| Oleic acid | 3–3.6 |
| Triethanolamine | 2.2–2.9 |
| Water | 41.5–58.1 |
| Make up to | 60–100 | or alternatively

CARNAUBA WAX BASE B

|  | Lbs. |
|---|---|
| Carnauba wax | 15–20 |
| Sodium or potassium oleate | 2.2–5.5 |
| Water | 60–100 |

CARNAUBA WAX BASE C

|  | Lbs. |
|---|---|
| Carnauba wax | 5–15 |
| Aerosol OT (100%) | 1–2 |
| Potassium soap of whole corn oil (20%) aqueous solution | 2–4 |
| Water | 40–60 |

The second portion is a mixture of polyvinyl alcohol and water, having the approximate composition ranges shown:

POLYVINYL ALCOHOL BASE

|  | Lbs. |
|---|---|
| Polyvinyl alcohol (Elvanol 51–05) | 12–20 |
| Soft water | 60–70 |
| Make up to final weight of | 72–90 |

The foregoing carnauba wax and polyvinyl alcohol bases are mixed together in the proportion of about 50% by weight of each, to form the coating composition of the invention.

The use of more than the indicated proportion of wax, while it enhances the permanence of the film, does not contribute to lubricity, and has the disadvantage of reducing acceptability of the surface to adhesives. Increasing the polyvinyl alcohol content reduces the permanence of the coating by rendering it more water soluble, and also has little or no effect on lubricity, although it may improve receptivity toward adhesives.

The general method of preparation of the coating dispersions of the invention comprises the steps of forming an aqueous suspension of the ingredients in the proportions indicated, and subjecting the suspension to treatment in a colloid mill until a dispersion is produced in which the particles are so finely comminuted that they are of colloidal dimensions.

The practice of the invention is illustrated by the following example:

EXAMPLE

There were separately prepared 80 lbs. each of the following two coating dispersion bases:

CARNAUBA WAX BASE

|  | Lbs. |
|---|---|
| Carnauba wax | 16.8 |
| Oleic acid | 3.3 |
| Triethanolamine | 2.7 |
| Water | 54 |
| Make up to final weight of | 80 |

POLYVINYL ALCOHOL BASE

|  | Lbs. |
|---|---|
| Polyvinyl alcohol (Elvanol 51–05) | 16 |
| Soft water | 64 |
| Total weight | 80 |

The foregoing bases were admixed in the proportions of 1:1 by weight.

The coating dispersion was applied to glassware at a dilution between about 35 to about 100 parts of water per 1 part of said mixture of equal parts by weight of the two bases. The diluted dispersion is applied to glassware preferably at a temperature of about 250° to about 300° F., which is about the temperature corresponding to the emergent end of an annealing lehr, in finely divided form, preferably by spraying.

When subjected to standard physical tests, the coating dispersion of the invention of the above example showed the following test characteristics:

TABLE 2

|  | Carnauba wax-polyvinyl alcohol |
|---|---|
| (1) Appearance | Clear |
| (2) Film strength | Good |
| (3) Average dry lubricity | .159 |
| (4) Average wet lubricity | .305 |
| (5) Hot water test: |  |
| (A) Average lub. before test | .144 |
| (B) Average lub. after test | .166 |
| (C) Difference in lub. | .022 |
| (6) Film strength after hot water test | Fair |
| (7) Percent of label adhesion—average | 44.7 |

EXAMPLE 2

There was prepared a carnauba wax emulsion having the following composition:

|  | Lbs. |
|---|---|
| Refined pure No. 2 carnauba wax | 10.0 |
| Aerosol OT (100%) | 1.5 |
| Potassium soap of whole corn oil (20% aqueous solution) | 3.0 |
| Distilled water | 48.0 | by melting the carnauba wax and adding the Aerosol OT and potassium soap at a temperature of 70°–80° C. to form a clear melt. The melt was then poured into the water maintained at 90–95° C. with agitation.

A solution of polyvinyl alcohol was separately prepared by adding 12 grams of Elvanol 5105 to 48 grams of hot water at 90° C. The resulting polyvinyl alcohol solution was then poured into the carnauba wax emulsion with stirring.

Proceeding as in Example 1, there were prepared the following two coating dispersion bases:

EXAMPLE 3

Carnauba wax base

|  | Lbs. |
|---|---|
| Carnauba wax | 42.0 |
| Oleic acid | 8.0 |
| 25% KOH | 6.32 |
| Water | 134.8 |
| Make up to water to final weight of | 200 |

Polyvinyl alcohol base

|  | Lbs. |
|---|---|
| Polyvinyl alcohol | 40.0 |
| Water | 160.0 |
| Total weight | 200.0 |

The foregoing bases were admixed in the proportions of 1:1 by weight. The resulting dispersion was applied in the same manner as in Example 1.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A coating composition for application to glass surfaces for lubrication and protection against contact damage, comprising an aqueous dispersion of from about 5 to about 42 parts by weight of carnauba wax, from about 12 to about 40 parts by weight of a colloidally dispersible, substantially cold-water insoluble polyvinyl alcohol, from about 2 to about 8 parts by weight of an anion-active dispersing agent selected from the group consisting of sodium dioctylsulfosuccinate and the potassium salt of corn oil fatty acids, and from about 100 to about 220 parts by weight of water.

2. Method of lubricating and protecting a glass surface against damage comprising diluting with from about 35 to about 100 parts by weight of water one part by weight of a coating composition comprising an aqueous dispersion of from about 5 to about 42 parts by weight of carnauba wax, from about 12 to about 40 parts by weight of a colloidally dispersible, substantially cold-water insoluble polyvinyl alcohol, from about 2 to about 8 parts by weight of an anion-active dispersing agent selected from the group consisting of sodium dioctylsulfosuccinate and the potassium salt of corn oil fatty acids, and from about 100 to about 220 parts by weight of water, applying the diluted composition in finely divided form to said glass surface while the surface is at a temperature of from about 250° F. to about 300° F., and drying the resulting coating.

3. A glass article having a coating over its glass surface comprising from about 5 to about 42 parts by weight of carnauba wax, from about 12 to about 40 parts by weight of a colloidally dispersible, substantially cold-water insoluble polyvinyl alcohol, and from about 2 to about 8 parts by weight of an anion-active dispersing agent selected from the group consisting of sodium dioctylsulfosuccinate and the potassium salt of corn oil fatty acids.

4. Method for lubricating and protecting a glass surface against contact damage comprising forming a coating of a metal oxide thereon by pyrolysis of a compound selected from the group consisting of a metallic or metallo-organic salt of aluminum, titanium, zirconium, germanium, tin and vanadium, thereafter diluting with about 35 to about 100 parts by weight of water one part by weight of a coating composition comprising an aqueous dispersion of from about 5 to about 42 parts by weight of carnauba wax, from about 12 to about 40 parts by weight of a colloidally dispersible substantially cold-water insoluble polyvinyl alcohol, from about 2 to about 8 parts by weight of an anion-active dispersing agent selected from the group consisting of sodium dioctylsulfosuccinate and the potassium salt of corn oil fatty acids, and from about 100 to about 220 parts by weight of water, applying said diluted composition in finely divided form to said glass surface while the surface is at a temperature of from about 250° F. to about 300° F., and drying the resulting coating.

5. A glass article having a coating over its glass surface comprising an inner coating of a metal oxide selected from the group consisting of the oxides of aluminum, titanium, zirconium, germanium, tin and vanadium and an outer coating which comprises from about 5 to about 42 parts by weight of carnauba wax, from about 12 to about 40 parts by weight of a colloidally dispersible substantially cold-water insoluble polyvinyl alcohol, and from about 2 to about 8 parts by weight of an anion-active dispersing agent selected from the group consisting of sodium dioctylsulfosuccinate and the potassium salt of corn oil fatty acids.

References Cited

UNITED STATES PATENTS 3,445,275  5/1969  Bogart.

DAVID KLEIN, Primary Examiner

U.S. Cl. X.R.

117—124; 260—28.5